United States Patent
Braune et al.

(10) Patent No.: US 8,139,204 B2
(45) Date of Patent: Mar. 20, 2012

(54) DISTANCE-MEASURING OPTOELECTRONIC SENSOR

(75) Inventors: Ingolf Braune, Gundelfingen (DE);
Markus Hammes, Freiburg (DE);
Stefan Schmitz, Freiburg (DE); Shane MacNamara, Ebringen (DE)

(73) Assignee: Sick AG, Waldkirch (DE)

( * ) Notice: Subject to any disclaimer, the term of this patent is extended or adjusted under 35 U.S.C. 154(b) by 115 days.

(21) Appl. No.: 12/825,433

(22) Filed: Jun. 29, 2010

(65) Prior Publication Data
US 2011/0001957 A1    Jan. 6, 2011

(30) Foreign Application Priority Data
Jul. 4, 2009    (DE) .......................... 10 2009 031 732

(51) Int. Cl.
*G01C 3/08*    (2006.01)
(52) U.S. Cl. .................................................... 356/4.01
(58) Field of Classification Search ............... 356/4.01
See application file for complete search history.

(56) References Cited

U.S. PATENT DOCUMENTS

| | | | |
|---|---|---|---|
| 7,440,620 B1* | 10/2008 | Aartsen ..................... | 382/218 |
| 2005/0128578 A1* | 6/2005 | Sugawara et al. ......... | 359/443 |
| 2007/0001111 A1* | 1/2007 | Rueb et al. ................ | 250/236 |
| 2007/0263903 A1* | 11/2007 | St. Hilaire et al. ........ | 382/106 |
| 2009/0002644 A1* | 1/2009 | Christensen et al. ..... | 353/85 |

FOREIGN PATENT DOCUMENTS

| DE | 103 10 768 A1 | 10/2003 |
|---|---|---|
| DE | 11 2006 000 918 T5 | 4/2008 |

OTHER PUBLICATIONS

German Examination Report, Mar. 25, 2010.

* cited by examiner

*Primary Examiner* — Thomas Tarcza
*Assistant Examiner* — Antoine J Bedard
(74) *Attorney, Agent, or Firm* — The Nath Law Group; Jerald L. Meyer; Robert T. Burns

(57) ABSTRACT

A distance-measuring optoelectronic sensor for the monitoring of a working zone is provided which is located within a detection zone of the sensor and at a first distance from the sensor, wherein the sensor has a lighting unit having a light source to illuminate the working zone at least partly as well as an object detection unit by means of which unauthorized objects in the working zone can be detected. In this respect, an illumination control is designed, in a switching-on phase, first to activate the lighting unit with a lower power so that a provisional working zone at a second distance from the sensor less than the first distance is illuminated with at most a preset maximum power;

Figure 1:
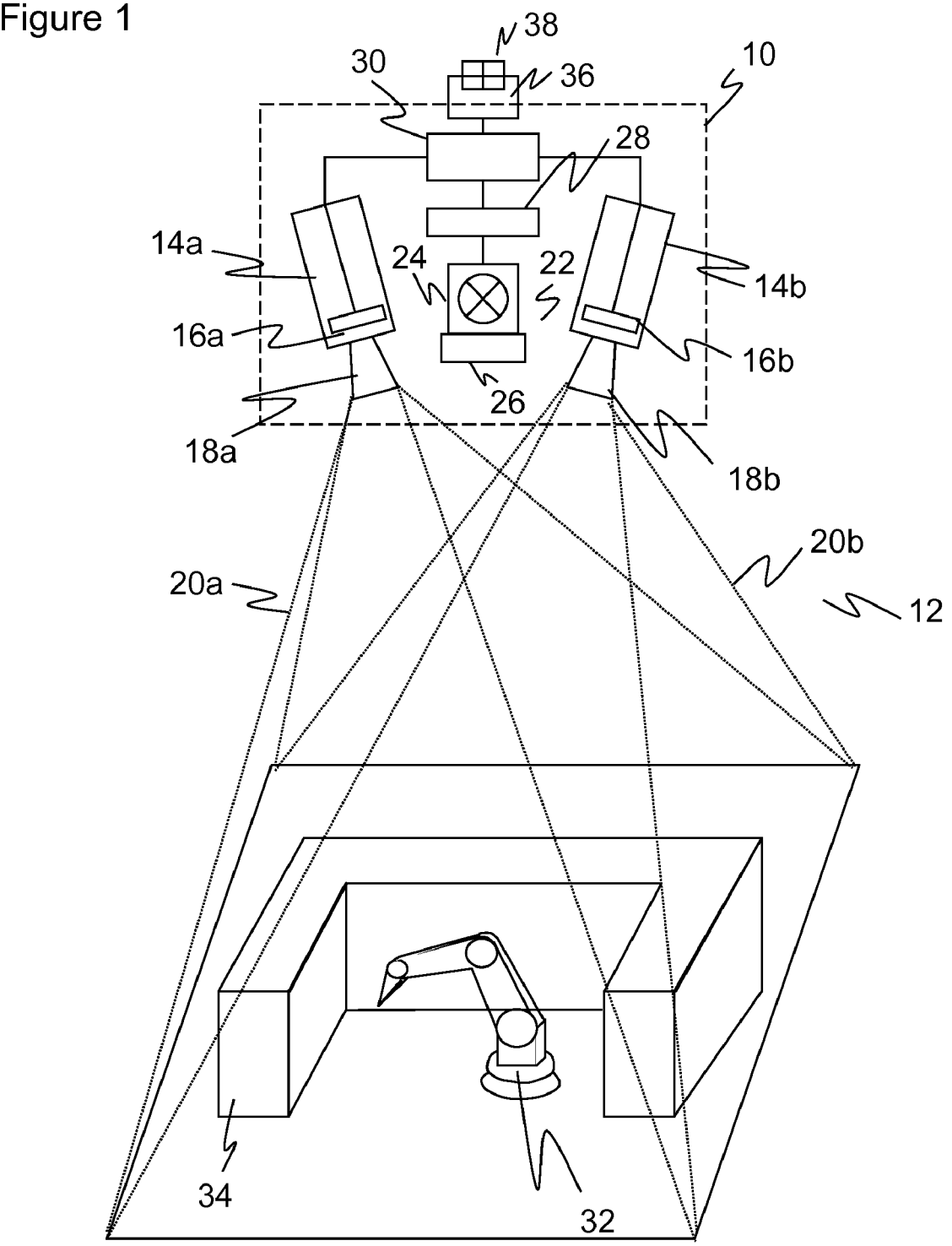

to check by means of the object detection unit whether an unauthorized object intrusion is taking place into the provisional working zone; and if no unauthorized object intrusion is recognized, to activate the lighting unit at a higher power so that the working zone is illuminated with at most the preset maximum power.

15 Claims, 3 Drawing Sheets

DISTANCE-MEASURING OPTOELECTRONIC SENSOR

The invention relates to a distance-measuring optoelectronic sensor and to a method for the monitoring of a working zone in accordance with the preamble of claim 1 and claim 9 respectively.

Distance-measuring optoelectronic sensors generate depth information over their field of vision and ultimately accordingly measure the distance from objects. Different technologies are known for this purpose. A number of them requires active illumination for their sensor function. A distance-measuring laser scanner, for example, determines distances in that short light pulses are transmitted and the pulse time of flight up to the reception of reflected or remitted light is converted into object distances via the speed of light. Alternatively, amplitude-modulated light is transmitted instead of light pulses and the time of flight is determined via a phase shift. The active illumination is here accordingly the scanning beam of the scanner.

Time-of-flight cameras actually evaluate times of flight of their transmitted light in every pixel of their matrix-type image sensor and thus generate complete depth maps or disparity maps, that is three-dimensional images whose depth information forms the spacings or distances determined in the individual pixels. A scanner is likewise able to generate depth maps, but for this purpose has to be deflected into two dimensions and, for example, scan a scene line-wise.

Stereoscopic camera systems take a plurality of two-dimensional images of a scene from slightly different perspectives. Structures which are the same are identified in the overlapping image regions and distances are calculated from the disparity and the optical parameters of the camera system by means of triangulation and thus a three-dimensional image or a depth map is calculated. Stereoscopy can basically also be used as passive stereoscopy without its own illumination. If, however, the scenery is of low contrast or has regions with little structure, the stereoscopic evaluation is unreliable. In this respect, at least two types of error are conceivable, namely a failure of the location of mutually corresponding structural elements or an erroneous association. As a consequence there are gaps in the three-dimensional images or erroneous calculations of the distances.

Active stereo measurement systems use, in addition to the reception system, that is substantially two mutually calibrated cameras, a lighting unit whose function it is to illuminate the observed scene with structured light and so to generate features in the images due to the numerous light/dark transitions by reference to which the stereo algorithm can extract reliable and dense distance data from the scene. Such patterns can naturally also be irregular, that is primarily not have any regions mutually symmetrical with respect to shifts for the present monitoring.

A particular application for distance-measuring sensors is safety technology. A typical application in safety technology is the securing of a dangerous machine such as a press or a robot where a securing takes place around the machine on intrusion of a body part into a danger area. Depending on the situation, this can be the switching off of the machine or the bringing into a safe position.

Protected zones can be fixed more variably and more precisely with the help of depth information in safety-technical applications and more and more precise classes of permitted object movements can be distinguished, that is, for example, movements of the robot itself or movements of a body part at the dangerous machine in a different depth plane which is completely safe per se, but cannot be differentiated by a two-dimensional sensor, not measuring distances such as a usual camera.

Safety-technical applications require more reliable distance data so that no unauthorized intrusion remains unrecognized and no intrusion has a false distance associated with it. Otherwise, a necessary switching off of the danger source may remain undone and may damage the health of the operator.

For this purpose, however, the illumination must be very powerful to provide sufficient light power over the total range. This applies to a particular degree to active stereoscopic systems in which the structure of the system's own illumination must also remain visible for the stereo camera under the influence of external light sources. Lasers are suitable as high-power light sources, but their emittable light power is restricted by demands of laser protection. EN 60825, for example, defines laser classifications, with usually its laser class 1 being aimed for which is safe with respect to protection of the eyes.

If the actual working zone in which a distance-measuring sensor should satisfy its monitoring task has a specific distance from the sensor or even a specific depth, a competitive situation arises. Either the lighting is dimensioned so that the full permitted light power, approximately corresponding to laser class 1, is available in the working zone. Since the light power per area falls with the distance from the sensor, even quadratically in the case of non-parallel light, the laser class is then no longer satisfied in the vicinity of the sensor or only a higher laser class is reached. If, conversely, the observation of a low laser class is already provided in direct proximity to the sensor, the range of the system is thereby considerably restricted.

In US 2007-0263903 A1, a stereo camera system generates a structured illumination pattern by means of a lighting unit which is then used to calculate distances. In this respect, the pattern arises in that a diffractive optical element is illuminated using a laser or an LED. Neither a safety-technical application nor aspects of eye safety are addressed in it.

EP 1 543 270 A1 discloses a passive stereo camera for the securing of a danger zone, wherein a scene analysis is carried out with reference to two algorithmically different processes. This description of a passive system naturally in no way looks at special demands of an active illumination.

A simple approach for the resolution of the aforesaid competitive situation comprises the fact of accepting the high laser classes, designating a laser protection officer and in each case only releasing the system manually using a start button when no one is in the vicinity of the light source. However, this requires a high additional effort on every putting into operation and possibly further measures laid down in the standard for the ensuring of eye protection.

It is therefore the object of the invention to provide illumination having high permitted light power for a distance-measuring optoelectronic sensor.

This object is satisfied by a distance-measuring optoelectronic sensor in accordance with claim 1 and by a method for the monitoring of a working zone in accordance with claim 9.

The solution in accordance with the invention in this respect starts from the basic idea that, due to the optical properties of the light source, the required laser protection reduces very fast as the distance from the sensor increases. A lower light power is already sufficient in the proximity of the sensor to check whether an unauthorized object is present there. The light power is subsequently increased to obtain the full recognition power of the sensor in the working zone of the sensor. A light power in the vicinity of the sensor, which is critical per se, is not hazardous in this respect because it is ensured that anyway no person is present in this zone.

From the point of view of the protection of operators, it is sufficient for the solution in accordance with the invention to ensure the maximum light power, for instance a light power in accordance with laser class 1. In practice, the aim is preferably simultaneously also to achieve the maximum light power at least largely where possible in order ideally to support the sensor function.

The invention has the advantage that the laser protection of the illumination is achieved and automatically monitored in all situations and the full permitted light power is nevertheless available in the working zone despite the thus always observed low demands on eye safety, defined, for instance, by laser classes. Additional safety measures, such as required higher laser classes, do not have to be taken.

Depending on the embodiment, the distance from the working zone or from the provisional working zone, must naturally be defined in an adapted manner. The distance can relate, for example, to a point of the working zone which closest to the sensor, to the near or far boundary surface of the working zone, to the center of mass or to another geometrical measurement.

The sensor can consider any intrusion as unauthorized, but also only such intrusions which are not taught or recognized as authorized, for example a fixed workbench, a closet, the regular work movement of a robot or a pallet moving through.

The illumination control is preferably made to switch off the lighting unit or to start the switching-on phase again if an unauthorized object intrusion into the provisional working zone takes place. Such intrusions take place too closely to the lighting unit where the observation of the limit of the maximum light power is not ensured in operation. The sensor then immediately switches the illumination off to protect the operator and above all his eyes. Alternatively, the switching-on phase is started again, that is the light power is in this respect reduced to a value also non-hazardous in the vicinity of the sensor. In this second mode, the sensor attempts to run through the switching-on phase for so long until the unauthorized intrusion ends and operation readiness can be achieved.

The illumination control is furthermore preferably made to lead the second distance to the first distance in distance steps in the switching-on phase and to activate the lighting unit with a higher power on a change of the second distance so that the respective provisional working zone is illuminated at the changed second distance with at most the preset maximum power. The provisional working range illuminated with light power sufficient for the full sensor function in this respect moves successively away from the sensor or is expanded successively further and further until the actual working zone is reached. The balance between observing laser protection conditions and ideal illumination is thus always ensured.

The distance steps are preferably so small that the provisional working zone runs through the interval between the original second distance and the first distance practically continuously or the distance steps correspond to a depth change of the working zone. Either the second distance is therefore enlarged continuously or quasi-continuously until it corresponds to the first distance or the distance steps are set by a thickness of the working zone, that is its extent in the depth direction, and provisional working zones are first displaced discretely and block-wise close to the sensor up to the actual working zone.

The higher power is advantageously fixable by the illumination control in dependence on the first distance or on the relationship of the first distance to the second distance. With reference to the geometrical circumstances, it can be calculated on this basis which power increase has the result that the provisional working zone and, after the end of the switching-on phase the working zone, is illuminated with the maximum, but simultaneously permitted light power.

Provision is made in a preferred further development, which is made to recognize unauthorized object intrusions into the working zone in an operating phase subsequent to the switching-on phase with the help of the object recognition unit and to output a switching-off signal if an unauthorized object intrusion takes place. The high-power illumination present in the working zone after the switching-on phase is particularly beneficial for safety-technical applications in which recognition errors would endanger the health of persons. A particular kind of unauthorized intrusion is when a person moves so close to the sensor within the working zone, for example uses a climbing system with a sensor mounted with a bird's eye view. Alternatively, the working zone also includes the intermediate zone between the danger zone to be monitored and the sensor, with then naturally a larger space having to be evaluated for objects. The illumination is in any case switched off before an intrusion into a zone with too high a light power is possible. Without illumination, a switching-off signal must additionally also be output to a monitored hazard source since the sensor no longer satisfies its monitoring task.

The sensor is advantageously made as a three-dimensional stereo camera, as a three-dimensional time of flight camera or as a laser scanner. A laser scanner having the illumination made as a scanning beam likewise shows an energy drop as the distance increases, even if this is less pronounced than with an areal illumination. The laser scanner is preferably made as a 3D laser scanner which therefore deflects its scanning beam into two dimensions and thus can take three-dimensional depth maps like a 3D camera.

The lighting unit preferably has a laser light source and a pattern generation element for the generation of a structured illumination pattern in the provisional working zone or in the working zone. Laser light sources are particularly high in luminosity and their coherence properties can be used to form structural patterns with high efficiency. Alternative light sources such as LEDs are admittedly not classified into protection classes, but an output power potentially damaging the eyes is also possible with such light sources and the invention can therefore be used with them.

The method in accordance with the invention can be further developed in a similar manner and shows similar advantages. Such advantageous features are described in an exemplary, but not exclusive manner in the subordinate claims dependent on the independent claims.

Figure 2:
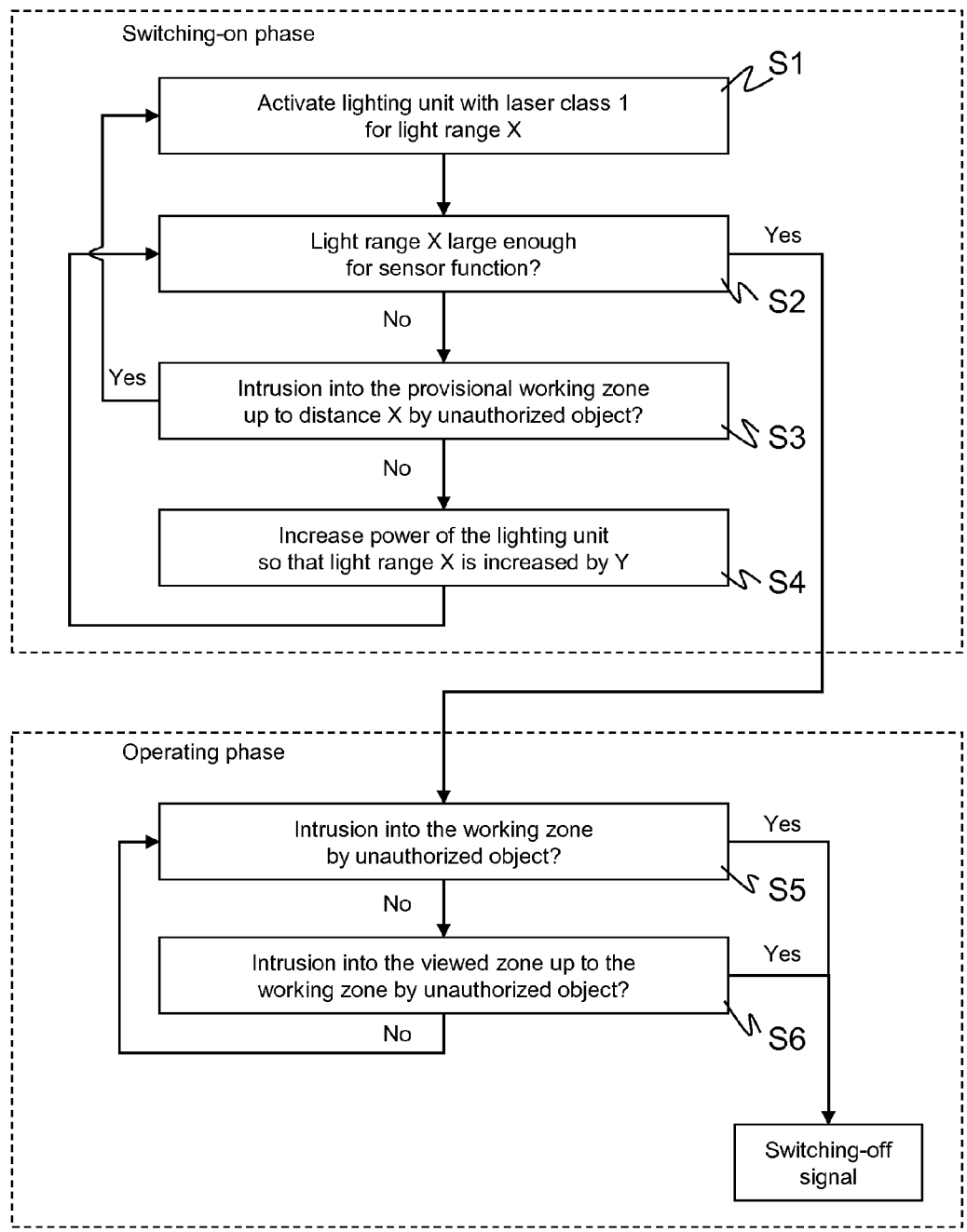
Figure 3:
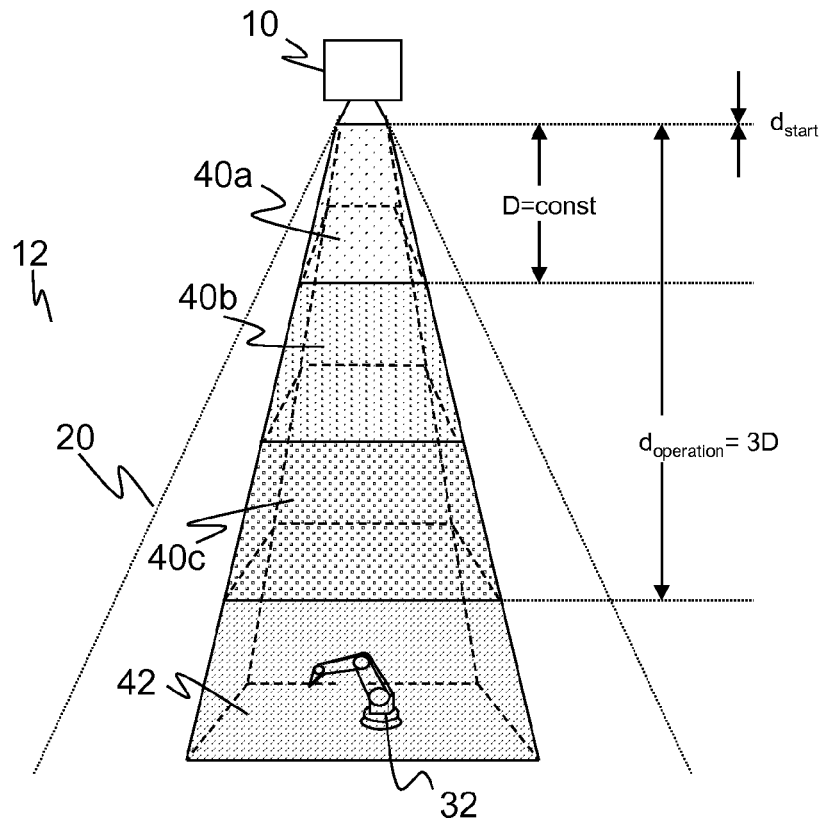
Figure 4:
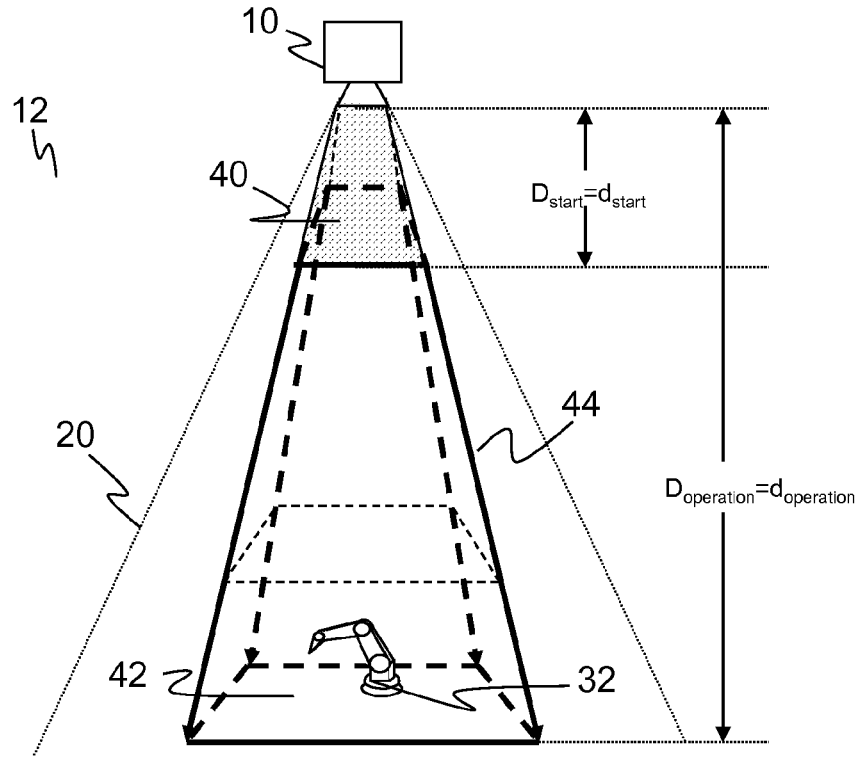

The invention will be explained in more detail in the following also with respect to further features and advantages by way of example with reference to embodiments and to the enclosed drawing. The Figures of the drawing show in:

FIG. 1 a schematic three-dimensional representation of an embodiment of the invention as a stereo camera which is monitoring a robot arm from above;

FIG. 2 a flowchart of the switching-on phase and of the operating phase of a sensor in accordance with the invention;

FIG. 3 a schematic representation of the further explanation of the switching-on phase in a first embodiment; and FIG. 4 a schematic representation in accordance with FIG. 3 for the further explanation of the switching-on phase in another embodiment.

FIG. 1 shows in a schematic three-dimensional representation the general structure of a distance-measuring sensor 10 in accordance with the invention in accordance with the stereo principle which is used for the safety-technical monitoring of a spatial zone 12. The sensor 10 is made as a stereoscopic safety camera in this embodiment. The invention is, however, independent of the manner with which the three-dimensional image data are gained and also includes other sensors, in particular the laser scanners and time-of-flight cameras mentioned in the introduction. The use of the invention is equally not restricted to safety technology. With this prefatory remark on the further application area, in the following only the example of a stereo 3D safety camera as a sensor 10 will be described in detail below.

Two camera modules 14a, 14b are mounted at a known fixed distance from one another and each take images of the spatial zone 12. An image sensor 16a, 16b, usually a matrix-type imaging chip, is provided in each camera and takes a rectangular pixel image, for example a CCD or a CMOS sensor. One lens 18a, 18b having an optical imaging system is associated with each of the image sensors 16a, 16b respectively which in practice can be realized as any known imaging lens. The viewing angle of these optical systems is shown in FIG. 1 by dashed lines which each form a pyramid of view 20a, 20b.

A lighting unit 22 is shown at the center between the two image sensors 16a, 16b, with this spatial arrangement only to be understood as an example and with the lighting unit equally being able to be arranged asymmetrically or even outside the 3D safety camera 10. This lighting unit 22 has a light source 24, for example one or more lasers or LEDs, as well as a pattern generating element 26 which is made, for example, as a mask, phase plate or diffractive optical element. The lighting unit 22 is thus able to illuminate the spatial zone 12 with a structured pattern. An illumination control 28 switches the light source 24 and determines its light power. The manner of operation of the illumination control 28 will be explained more precisely further below in connection with FIGS. 2 to 4.

A control 30 is connected to the two image sensors 16a, 16b and to the illumination control 28, said control receiving image data of the image sensors 16a, 16b and calculating three-dimensional image data (distance image, depth map) of the spatial zone 12 from them with the help of a stereoscopic disparity estimate. The structured illumination pattern in this respect provides a good contrast and an unambiguously associable structure of every picture element in the illuminated spatial zone 12.

Known and unexpected objects can be located in the spatial zone 12 monitored by the safety sensor 10. It can in this respect, as shown for example, be a robot arm 32, but also any other machine, an operator or anything else. The spatial zone 12 provides access to a danger source, whether because it is an access zone or because a dangerous machine such as the robot arm 32 is located in the spatial zone 32 itself. To secure this danger source, one or more virtual protection fields and warning fields 34 can be configured. They form a virtual fence around the dangerous machine 32. It is possible due to the three-dimensional evaluation to define protection fields and warning fields 34 three-dimensionally so that a high flexibility arises.

The control 30 evaluates the three-dimensional image data for unauthorized intrusions. The evaluation rules can prescribe, for example, that no object at all may be present in protection fields 34. More flexible evaluation rules provide differentiating between allowed and unallowed objects, for instance with reference to movement orbits, patterns or contours, speeds or general work routines which are both taught in advance as allowed and estimated during operation with reference to evaluations, heuristics or classifications.

If the control 30 recognizes an unauthorized intrusion into a protected field, a warning is output or the danger source is secured, for example the robot arm is stopped via a warning or switching-off device 36, which can in turn be integrated into the control 30. Safety-relevant signals, that is above all the switching-off signal, are output via a safety output 38 (OSSD, output signal switching device). In this respect, it depends on the application whether a warning is sufficient or a two-stage security is provided in which a warning is initially given and a switching off is only made on a continued object intrusion or an even deeper penetration. Instead of a switching off, the appropriate reaction can also be the immediate bringing into a non-dangerous parked position.

The sensor 10 is designed as failsafe to be suitable for safety-technical applications. This means, among other things, that the sensor 10 can test itself also in cycles below the required response time, in particular also recognizes defects of the lighting unit 22 and thus ensures that the illumination pattern 38 is available in an expected minimum intensity and that the safety output 38 and the warning or switching off device 36 are made safe, for example with two channels. The control 30 is equally also self-reliant, that is evaluates with two channels or uses algorithms which can test themselves. Such regulations are standardized for generally contactlessly acting protective devices in EN 61496-1 or in IEC-61496. And 13849 and are standardized in DIN EN ISO 13849 and EN 61508. A corresponding standard for safety cameras is under preparation.

In accordance with the invention, a switching-on phase of the lighting unit 22 in which the illumination control 28 sets the desired light power of the lighting unit 22 is provided before the operating phase in which the lighting unit 22 illuminates a working zone of the sensor 10 around the robot arm 30 with an ideal light power. The course of the switching-on phase and of the operating phase is shown in FIG. 2.

In a first step S1, the illumination control 28 activates the light source 24 with a preset maximum light power which is fixed by the demands of laser class 1 or by other safety provisions for persons which have to be satisfied. The light power is sufficient to guarantee the detection capability of the sensor 10 in a provisional working zone up to a highest range X.

The different working zones are illustrated in an embodiment in FIG. 3. The sensor 10 is only symbolized as a simple camera there for better clarity. The provisional working zone 40a of the step Si starts in front of the sensor 10 and has an extent D in the depth direction. The initial range X is the same as or larger than the depth extent D.

In a second step S2, a check is now made whether the light range X is sufficient for the sensor function. This is not the case in the situation of FIG. 3. If the initial light range X were already to provide a sufficient illumination for the monitoring of the robot arm 32, a switching-on phase can be dispensed with.

In a third step S3, the sufficiently illuminated provisional working zone 40a is now checked for unauthorized object intrusions. No person should be located close to the sensor 10, for example. If an unauthorized object intrusion is recognized, the switching-on phase in the first step S1 starts again. In this respect, provided that the light power was changed within the switching-on phase, a switch back to the original light power is immediately made so that a danger to persons is excluded. The switching-on phase is thus in an endless loop until the unauthorized intrusion is ended. Alternatively, the sensor 10 can display the switching-on phase as failed immediately or after some loops and abort further attempts to achieve an operating readiness.

If the provisional working zone 40a is free of unauthorized object intrusions and thus of potentially endangered persons, the illumination control 28 increases the power of the light source 22, and thus the light range X, by an amount Y in a fourth step S4. The provisional working zone 40a is displaced further in the direction of the robot arm 32 to be monitored so that the new provisional working zone 40b has a greater distance from the sensor 10 than the original provisional working range 40b. The provisional working range 40b also has the constant depth extent D. The increase in the light power is dimensioned by way of the power loss per surface due to the larger distance. In some situations, the initial light power and thus the initial light range X can still be sufficient for the first displacements of the provisional working zone 40a-c, deviating from the shown procedure.

In step 2, a check is again made with the increased light power whether the new light range X is now sufficient to monitor the robot arm 32. The provisional working zone 40b is displaced, if no unauthorized object intrusions take place at any point, in a loop of steps S2 to S4 analog to the described first passage through this loop over a further provisional working zone 40c to the actual working zone 42. The condition is thus satisfied in step 2 that the light range X is sufficient for the illumination of the working zone 42 with the robot arm 32 and the switching-on phase moves into the operating phase.

In the operating phase, the control 30 monitors in a step S5 in a constantly run through cycle whether an unauthorized intrusion into a protected zone 34 takes place. If this is the case, a switching-off signal is output to the robot arm 32.

In addition, a check is made in the cycle in a step S6 whether the region up to the working zone 42 is still free of persons. This can take place in two ways: Either an object recognition is actually carried out in the field of vision up to the working zone 42, that is ultimately the provisional working zones 40a-c are also monitored, or it is monitored whether an object is moving in the marginal region of the working zone 42 close to the sensor. This could be a worker, for example, who is trying to reach the sensor 10 with a climbing aid. If a person comes too close to the sensor 10, the lighting unit 22 is switched off. The sensor 10 is thus no longer ready for use and additionally generates a switching-off signal to the robot arm 32.

The actual working zone 42 with the robot arm 32 to be monitored likewise has the constant depth extent or thickness D. This thickness D is preset by where protection zones should be definable for the operating phase. For example, the fitting of the sensor 10 to the ceiling is not necessary to still monitor a height from approximately 2.50 meters above the floor since no person reaches this height. As soon as a person reaches a height of, for example, 2.40 meters, this is evaluated as a climbing attempt in step S6 and the lighting unit 22 is switched off. The working zone 42 restricted to the depth extent D can be monitored with considerably less effort than the total sight pyramid. This in particular applies to stereoscopy which requires a great deal of calculation due to the great disparities.

With a switching-on phase in accordance with the flowchart of FIG. 2 in an embodiment in accordance with FIG. 3, the region close to the sensor before the actual working zone 42 is checked block-wise and discretely with provisional working zones 40a-c with successively higher light power. In this respect, the distance $d_{start}$ from the provisional working zone 40 amounts to zero at the start or is at least close to the sensor 10. The reference of the provisional working zone 40a is in this respect the boundary surface of the working zone 40a close to the sensor. At the end of the switching-on phase, the distance $d_{operation}$ in the example shown amounts to three thicknesses D of the working zone 42. Modifications with other multiples and also fractions of D are naturally also conceivable.

In an alternative embodiment in accordance with FIG. 4, which likewise follows the flowchart of FIG. 2, the initial provisional working zone is not displaced as in FIG. 3, but is rather pulled up and thus enlarged. This is shown by arrows 44. In this case, the process accordingly starts with a thickness $D_{start}$ of the provisional working zone 40 and a distance $d_{start}$ which, unlike the embodiment of FIG. 3, is related to the boundary surface of the provisional working zone 40 distant from the sensor. During the power adaptation in the steps S2 and S4, the distance and the depth extent of the provisional working zone 40 change equally until, at distance $d_{operation}$, a final working zone of the depth extent $D_{operation}$ is reached.

Mixed forms of the two embodiments described with respect to FIGS. 3 and 4 are also conceivable in which the provisional working zone 40, 40a-c is therefore both displaced and enlarged or reduced. The adaptation steps in step S4 can equally be both fine, up to continuous or quasi-continuous, and coarse, for example in the order of magnitude of the thickness of the working zone 42. Finally, it is also conceivable to observe a specific distance from the sensor 10 from the start with the provisional working zone, preferably so far that the range of the permitted light power is just utilized.

In summary, the light source 22 is thus slowly increased in its power, starting from a permitted power, for example in the range of laser class 1. At the same time, the sensor 10 monitors whether the region in front of the light source 22 is free. The provisional working zone 40, 40a-c thus effectively moves away to increasing working distances from the sensor 10 for so long until no intrusions are recognized except for defined authorized objects. The complex large disparities in the near zone only have to be calculated at the start in this respect. It is also conceivable to reduce this effort even further by a pre-displacement, that is already to observe a specific distance from the sensor 10 at the start of the switching-on phase. If the provisional working zone 40, 40a-c, and thus the region in front of the sensor 10, is free, the working zone is displaced or enlarged and the light power is increased accordingly. This procedure is repeated step-wise or continuously until the specified working distance and the actual working volume 42 is reached.

In operation, the lighting unit 22 is switched off as soon as an object comes too close to the light source 22. For this purpose, the object distance is checked in order, for example, to recognize a worker who is climbing up to the sensor 10 using a climbing aid. It is thus prevented that persons enter into areas of too high a light power.

No special features have to be observed on the switching off of the sensor 10 since the light source 22 is also switched off here.

The invention claimed is:

1. A distance-measuring optoelectronic sensor for the monitoring of a working zone which is located within a detection zone of the sensor and at a first distance from the sensor, wherein the sensor has a lighting unit having a light source to illuminate the working zone at least partly as well as an object detection unit by means of which unauthorized objects in the working zone can be detected, characterized by an illumination control, which is designed, in a switching-on phase, first to activate the lighting unit with a lower power so that a provisional working zone at a second distance from the sensor less than the first distance is illuminated with at most a preset maximum power;

to check by means of the object detection unit whether an unauthorized object intrusion is taking place into the provisional working zone; and if no unauthorized object intrusion is recognized, to activate the lighting unit at a higher power so that the working zone is illuminated with at most the preset maximum power.

2. The sensor in accordance with claim 1, wherein the illumination control is made to switch off the lighting unit or to start the switching-on phase again if an unauthorized object intrusion into the provisional working zone takes place.

3. The sensor in accordance with claim 1, wherein the illumination control is made to lead the second distance to the first distance in distance steps in the switching-on phase and to activate the lighting unit with a higher power on a change of the second distance so that the respective provisional working zone is illuminated in the changed second distance with at most the preset maximum power.

4. The sensor in accordance with claim 3, wherein the working steps are so small that the provisional working zone runs through the interval between the original second distance and the first distance practically continuously; or wherein the distance steps correspond to a depth extent of the working zone.

5. The sensor in accordance claim 1, wherein the higher power of the illumination control is fixable in dependence on the first distance or on the relationship of the first distance to the second distance.

6. The sensor in accordance with claim 1, wherein a switching-off unit is provided which is made to recognize unauthorized object intrusions into the working zone in an operating phase subsequent to the switching-on phase with the help of the object recognition unit and to output a switching-off signal if an unauthorized object intrusion takes place.

7. The sensor in accordance with claim 1, which is made as a three-dimensional stereo camera, as a three-dimensional time-of-flight camera or as a laser scanner.

8. The sensor in accordance with claim 1, wherein the lighting unit has a laser light source and a pattern generation element for the generation of a structured illumination pattern in the provisional working zone or in the working zone.

9. A method for the monitoring of a working zone which is located within a detection zone of a distance-measuring opto-electronic sensor and at a first distance from the sensor, wherein the working zone is illuminated by a lighting unit at least in part; and wherein unauthorized objects in the working zone are detected, characterized in that, in a switching-on phase, the lighting unit is first activated at a lower power so that a provisional working zone at a second distance from the sensor less than the first distance is illuminated with at most a preset maximum power;

a check is made whether an unauthorized object intrusion into the provisional working zone is taking place; and if no unauthorized object intrusion is recognized, the lighting unit is activated at a higher power so that the working zone is illuminated with at most the preset maximum power.

10. The method in accordance with claim 9, wherein the lighting unit is switched off or the switching-on phase is started again if an unauthorized object intrusion into the provisional working zone takes place.

11. The method in accordance with claim 9, wherein the second distance is led to the first distance in distance steps in the switching-on phase and the lighting unit is activated at a higher power on a change to the second distance so that the respective provisional working zone is illuminated in the changed second distance with at most the preset maximum power.

12. The method in accordance with claim 11, wherein the working steps are so small that the provisional working zone runs through the interval between the original second distance and the first distance practically continuously; or wherein the distance steps correspond to a depth extent of the working zone.

13. The method in accordance with claim 9, wherein the higher power of the illumination control is fixed in dependence on the first distance or on the relationship of the first distance to the second distance.

14. The method in accordance with claim 9, wherein unauthorized object intrusions into the working zone are recognized in an operating phase subsequent to the switching-on phase with the help of the object detection unit and a switching-off signal is output if an unauthorized object intrusion takes place.

15. The method in accordance with claim 9, wherein the sensor is made as a three-dimensional stereo camera, as a three-dimensional time-of-flight camera or as a laser scanner; and wherein the lighting unit has a laser light source and a pattern generation element for the generation of a structured illumination pattern in the provisional working zone or in the working zone.

* * * * *